United States Patent [19]

Huppert

[11] Patent Number: 4,765,603
[45] Date of Patent: Aug. 23, 1988

[54] CUTTING BOARD

[75] Inventor: Raymond H. Huppert, Rte. 1, Box 74, Ellsworth, Wis. 54011

[73] Assignee: Raymond Huppert, Ellsworth, Wis.

[21] Appl. No.: 851,523

[22] Filed: Apr. 14, 1986

[51] Int. Cl.⁴ ............................ A47J 43/00; B23Q 3/00
[52] U.S. Cl. ............................... 269/302.1; 269/289 R
[58] Field of Search ................. 4/577, , 579, 656, 638, 4/637; 134/115 R; 5/507; 264/302.1, 289 R, 15; 99/536

[56] References Cited

U.S. PATENT DOCUMENTS

| | | | |
|---|---|---|---|
| 602,125 | 4/1898 | Burrows | 4/579 |
| 736,032 | 8/1903 | Silver | 4/579 |
| 1,103,516 | 7/1914 | Joy et al. | 4/579 |
| 1,643,906 | 9/1927 | Russel | 4/656 |
| 2,236,927 | 4/1941 | Thomas | 4/579 |
| 2,588,562 | 3/1952 | Parish | 4/579 |
| 3,086,221 | 4/1963 | Gass | 4/579 |
| 4,033,461 | 7/1977 | Nevai | 4/656 |
| 4,041,964 | 8/1977 | Slamoon | 134/115 R |
| 4,456,021 | 6/1984 | Leavens | 134/115 R |

FOREIGN PATENT DOCUMENTS 202442 10/1908 Fed. Rep. of Germany .......... 5/507

Primary Examiner—Robert C. Watson
Attorney, Agent, or Firm—Merchant, Gould, Smith, Edell, Welter & Schmidt

[57] ABSTRACT

A cutting board made of wood, plastic, or the like which can be stably suspended over a sink which comprises four substantially rigid legs attached to a planar surface. The design of the cutting board allow for simultaneous use of the cutting surface, sink basin and water faucet.

2 Claims, 1 Drawing Sheet

FIG. 1
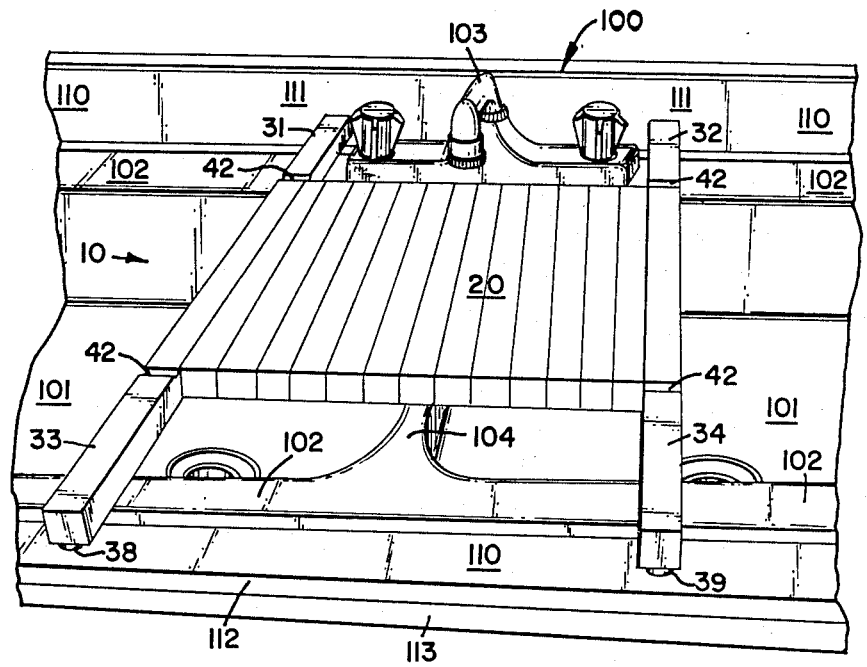
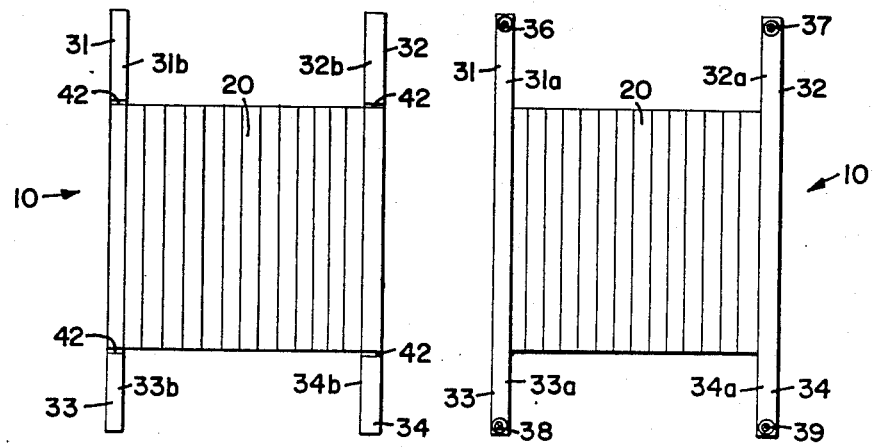
FIG. 2　　　　　FIG. 3

CUTTING BOARD

FIELD OF THE INVENTION

My invention relates to cutting boards. More specifically, my invention relates to cutting boards intended for use over a sink basin. Most specifically, my invention relates to cutting boards capable of being stably suspended and utilized over the center of a sink basin.

BACKGROUND OF THE INVENTION

Cutting boards intended for use over a sink basin are well known and offer significant advantages over other types. These basin-type cutting boards substantially eliminate scratching of countertop surfaces and greatly reduce cleanup time as liquids and juices released during the cutting process drain directly into a sink basin. While basin-type cutting boards offer significant advantages further improvement is possible. Typical basin-type cutting boards are configured to be used slightly recessed in the sink basin to reduce splattering creating problems as impeding access to the sink basin below and hindering the cutting of items on the board at an angle parallel to the cutting surface of the board.

Accordingly, a need exists for a cutting board which may be suspended over a sink basin while allowing simultaneous, virtually unimpeded use of the cutting board, the faucet and the basin.

SUMMARY OF THE INVENTION

I have invented a cutting board capable of being stably suspended over the center of a sink basin which offers the advantages of: (i) virtually unimpeded access to the basin over which the board is used; (ii) ability to simultaneously use the cutting board, the faucet and the basin; (iii) ability to adjust the faucet to allow water to either flow directly into the basin or onto the cutting board surface; and (iv) ability to cut items, such as fish, on the board at any angle parallel to the cutting surface of the board.

Fundamentally, my cutting board comprises (i) a solid planar surface about 4 to 25 inches wide and about 4 to 25 inches long; (ii) first and second substantially rigid legs coupled to and extending substantially radially outward from the planar surface in a first direction; and (iii) third and fourth substantially rigid legs coupled to and extending substantially radially outward from the planar surface in a second direction which is directly opposed to the first direction; the first and second legs configured so that they pass on opposite sides of the faucet when the cutting board is being used.

As utilized herein, "basin" refers to both single basins as typically found in vanities and household bathroom sinks and double basins as typically found in household kitchen sinks.

BRIEF DESCRIPTION OF THE DRAWINGS

FIG. 1 is a perspective view of one embodiment of this invention placed over a sink basin.

FIG. 2 is a top view of the invention embodiment shown in FIG. 1.

FIG. 3 is a bottom view of the invention embodiment shown in FIG. 1.

DETAILED DESCRIPTION OF THE INVENTION INCLUDING A BEST MODE

My cutting board, denoted generally as 10, comprises a solid planar cutting surface 20 and a means of supporting cutting surface 20 over a sink basin 101 such that access to basin 101 is not substantially impeded thereby. Preferably, the supporting means comprises four substantially rigid legs 31–34 coupled to and extending substantially radially outward from planar surface 20 with first leg 31 and second leg 32 extending in a first direction and third leg 33 and fourth leg 34 extending in a second direction wherein the second direction is directly opposed to the first direction. While first leg 31 and second leg 32 must extend to some extent in the first direction and the third leg 32 and fourth leg 34 must extend to some extent in the second direction, all four legs 31–34 may additionally extend in other directions.

Legs 31–34 are configured to engage the horizontal flange 102 of a sink 100 and/or the surrounding countertop 110. Most preferably, the board 10 is sized and configured so that first leg 31 and second leg 32 will abut the forward vertical wall or splash guard 111 of countertop 110 and third leg 33 and fourth leg 34 will abut raised upper lip 112 on leading edge 113 of countertop 110 reducing the tendency of board 10 to slide. Preferably the entire cutting board 10 is about 22 to 24 inches long measured along the axis extending in the first and second directions to achieve stabilizing contact with splash guard 111 and upper lip 112 as typical countertops 110 are about 22 to 24 inches from splash guard 111 to upper lip 112.

To further reduce the tendency of cutting board 10 to slip, antiskid pads 36–39 may be coupled to legs 31–34 to provide a non-skid contact point. Preferably antiskid pads 36–39 are placed near the terminal end and on the bottom surface 31a, 32a, 33a and 34a of each leg 31–34 respectively. While any well known antiskid material may be used, natural rubber is preferred as it leaves no marks on countertops and is inexpensive.

My cutting board 10 may further comprise transverse grooves 42 along the top surface 31b, 32b, 33b, and 34b of each leg 31–34 respectively to prevent water from flowing longitudinally along legs 31–34 and onto countertop 110.

Planar surface 20 of cutting board 10 should be sized and shaped to provide sufficient surface area for cutting without being so large as to be cumbersome and substantially impede access to basin 101 below. With this in mind, cutting board 10 may be about 4 to 25 inches wide and about 4 to 25 inches long. Preferably, planar surface 20 of cutting board 10 is about 8 to 15 inches wide, about 8 to 15 inches long, and about ¼ to 2 inches thick. Most preferably, planar surface 20 of cutting board 10 is about 10 to 12 inches wide, about 10 to 15 inches long, and about ½ to 1 inch thick. Preferably cutting surface 20 has an area between about 100 square inches to about 180 square inches.

Preferably, legs 31–34 are substantially linear and each about 3 to 10 inches long. Most preferably, first leg 31 and second leg 32 extend substantially the same distance, are substantially parallel and are about 4 to 7 inches long. Also most preferably, third leg 33 and fourth leg 34 extend substantially the same distance, are substantially parallel, and are about 4 to 7 inches long.

My cutting board 10 may be made of any material commonly employed for cutting boards including polyolefins such as polyethylene and polypropylene, and cellulosic materials such as wood. For aesthetic reasons, wood is the preferred material.

The area between first leg 31 and second leg 32 should be sufficient to accomodate a sink faucet 103 so that when cutting board 10 is properly positioned over basin 101 faucet 103 does not prevent cutting board 10 from resting stably in a substantially horizontal position. While the most appropriate distance between first leg 31 and second leg 32 will depend upon the shape of legs 31 and 32 and the size of faucet 103, generally first leg 31 and second leg 32 are preferably substantially linear, substantially parallel, and about 6 to 15 inches apart. Most preferably, first leg 31 and second leg 32 are substantially linear, substantially parallel, and about 10 to 12 inches apart.

My cutting board 10 is capable of being used directly above divider wall 104 of a double basin. sink 100 and below sink faucet 103 allowing simultaneous use of cutting board 10 and both of sink basins 101.

Other modifications of the invention will be apparent to those skilled in the art in light of the foregoing description. This description provides explicit examples of individual embodiments to clearly describe my invention. Accordingly, the invention is not limited to the embodiments described but includes all alternative modifications and variations which fall within the spirit and scope of the appended claims.

I claim:

1. A cutting board which can be stably suspended over the center of a sink having double basins and beneath the sink faucet so as to allow simultaneous use of the cutting board, the basins and the faucet, which comprises:
    (a) a solid planar surface about 10 to 12 inches wide, 10 to 15 inches long, and ½ to 1 inch thick;
    (b) a first, substantially linear, substantially rigid leg about 4 to 7 inches long which is coupled to and extends substantially radially outward from the planar surface in a first direction;
    (c) a second, linear, substantially rigid leg about 4 to 7 inches long which is coupled to and extends substantially radially outward from the planar surface in the first direction, the first and second legs (i) extending substantially the same distance from the planar surface, (ii) being substantially parallel, and (iii) being about 10 to 12 inches apart;
    (d) a third, substantially linear, substantially rigid leg about 4 to 7 inches long which is coupled to and extends substantially radially outward from the planar surface in a second direction which is substantially opposed to the first direction;
    (e) a fourth, substantially linear substantially rigid leg about 4 to 7 inches long which is coupled to and extends substantially radially outward from the planar surface in the second direction, the third and fourth legs extending substantially the same distance from the planar surface and being substantially parallel;
    (f) antiskid pads coupled to the terminal portion of each leg to reduce the tendency of the cutting board to slip when used; and
    (g) transverse grooves on each leg to prevent water from flowing longitudinally along the legs; wherein the entire cutting board is about 22 to 24 inches long measured along a line extending in the first and second directions.

2. The cutting board of claim 1 wherein the first, second, third and fourth legs are wooden.

* * * * *